United States Patent
Badarlis

(10) Patent No.: US 11,300,461 B2
(45) Date of Patent: Apr. 12, 2022

(54) MEASURING DEVICE FOR THE DETERMINATION OF AT LEAST ONE THERMAL PROPERTY OF A FLUID, ESPECIALLY THE VOLUMETRIC HEAT CAPACITY AND THE THERMAL CONDUCTIVITY

(71) Applicant: Endress+Hauser Flowtec AG, Reinach (CH)

(72) Inventor: Anastasios Badarlis, Birsfelden (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 48 days.

(21) Appl. No.: 16/955,944

(22) PCT Filed: Nov. 14, 2018

(86) PCT No.: PCT/EP2018/081234
§ 371 (c)(1),
(2) Date: Jun. 19, 2020

(87) PCT Pub. No.: WO2019/120772
PCT Pub. Date: Jun. 27, 2019

(65) Prior Publication Data
US 2020/0326247 A1    Oct. 15, 2020

(30) Foreign Application Priority Data
Dec. 20, 2017  (DE) ............... 10 2017 130 774.5

(51) Int. Cl.
*G01N 25/18*    (2006.01)
*G01K 1/00*     (2006.01)
(Continued)

(52) U.S. Cl.
CPC ............ *G01K 17/00* (2013.01); *G01N 25/18* (2013.01)

(58) Field of Classification Search
USPC .......................... 374/44, 208, 166, 110, 117
See application file for complete search history.

(56) References Cited

U.S. PATENT DOCUMENTS

| 5,117,696 A * | 6/1992 | Schmid ............... G01P 15/0907 310/329 |
| 6,290,388 B1 * | 9/2001 | Saul .................. G01K 7/01 374/44 |

(Continued)

FOREIGN PATENT DOCUMENTS

| CA | 2029292 A1 | 11/1991 |
| CN | 101017146 A | 8/2007 |

(Continued)

OTHER PUBLICATIONS

Translation of DE102005023377A1 (Heinrich et al) (Year: 2006).*

(Continued)

*Primary Examiner* — Mirellys Jagan
(74) *Attorney, Agent, or Firm* — Christopher R. Powers; Endress+Hauser (USA) Holding Inc.

(57) ABSTRACT

A measuring device for the determination of at least one thermal property of a fluid, for example, the volumetric heat capacity and the thermal conductivity, wherein the measuring device includes a thermal property sensor and an evaluation unit, wherein the evaluation unit is adapted to determine the thermal property from a measurement signal determined by the thermal property sensor, wherein the thermal property sensor includes a heater, a first temperature sensor and a second temperature sensor, wherein the thermal property sensor includes a mounting plate with an opening, wherein the heater, the first temperature sensor and the second temperature sensor are arranged above or inside the opening.

18 Claims, 2 Drawing Sheets

(51) Int. Cl.
G01K 11/00 (2006.01)
G01K 17/00 (2006.01)

(56) References Cited

U.S. PATENT DOCUMENTS

| | | | |
|---|---|---|---|
| 10,724,976 B2* | 7/2020 | Rogers | G01N 27/12 |
| 2009/0092169 A1 | 4/2009 | Hallen et al. | |
| 2014/0016664 A1* | 1/2014 | Pauchet | G01N 25/18 |
| | | | 374/44 |

FOREIGN PATENT DOCUMENTS

| | | |
|---|---|---|
| DE | 102005023377 A1 | 11/2005 |
| DE | 102005023377 A1 | 11/2006 |
| EP | 0439950 A1 | 8/1991 |
| EP | 1351039 A1 | 10/2003 |
| JP | 11118553 A | 4/1999 |
| WO | 2015074833 A1 | 5/2015 |
| WO | 2016202538 A1 | 12/2016 |

OTHER PUBLICATIONS

Kliche, Kurt, Kattinger, Gerhard, Billat, Sophie, Shen, Liwei, Messner, Stephan and Zengerle, Roland, Sensor for Thermal Gas Analysis Based on Micromachined Silicon-Microwires, IEEE Sensors Journal, vol. 13, No. 7, Jul. 2013, 10 pp. (2626-2635).

Badarlis, Anastasios, Stingelin, Simon, Pfau, Axel, and Kalfas, Anestis, Measurement of Gas Thermal Properties Using the Parametric Reduced-Order Modeling Approach, IEEE Sensors Journal, vol. 16, No. 12, Jun. 15, 2016, 11 pp. (4704-4714).

\* cited by examiner

MEASURING DEVICE FOR THE DETERMINATION OF AT LEAST ONE THERMAL PROPERTY OF A FLUID, ESPECIALLY THE VOLUMETRIC HEAT CAPACITY AND THE THERMAL CONDUCTIVITY

CROSS-REFERENCE TO RELATED APPLICATIONS

The present application is related to and claims the priority benefit of German Patent Application No. 10 2017 130 774.5, filed on Dec. 20, 2017, and International Patent Application No. PCT/EP2018/081234, filed on Nov. 14, 2018, the entire contents of which are incorporated herein by reference.

TECHNICAL FIELD

The present disclosure relates to a measuring device for the determination of at least one thermal property of a fluid.

BACKGROUND

A measuring device related to the field of the present disclosure is described in particular in WO 2015/074833 A1. This measuring device is provided with a first and a second sensor element. The second sensor element is a cantilever that can be used for the determination of a viscosity and the first sensor element is a thermal property sensor, which can measure the volumetric heat capacity and the thermal conductivity.

The thermal property sensor is provided with a heater and two temperature sensors, wherein one temperature sensor has a bigger distance from the heater than the second temperature sensor. The measuring device comprises a support plate where the first and the second sensor element are mounted. For the vibration of the cantilever the support plate is provided with an opening. The heater and the first and second temperature sensor are directly attached to a closed section of the surface of the support.

A further measuring device is disclosed by WO 2016/202538 A1, especially in FIG. 6. A support plate is provided with an opening, which can also be defined as a window. A heater and a first temperature sensor are placed inside the opening and are distanced from each other.

SUMMARY

The problem to be solved is to provide a measuring device which can determine at least one thermal property of a fluid with higher accuracy compared to the state of the art.

The current invention provides a solution for this problem with a measuring device with the features of claim 1.

An inventive measuring device for the determination of at least one thermal property of a fluid, especially the volumetric heat capacity and the thermal conductivity, comprises a thermal property sensor and an evaluation unit.

The evaluation unit is adapted to determine the thermal property from a measurement signal determined by the thermal property sensor. The sensor element comprises a heater, a first and a second temperature sensor. The thermal sensor element further comprises a mounting plate with an opening.

According to the invention the heater, the first temperature sensor and the second temperature sensor are arranged above or inside the opening. Above should be defined according to the invention that the aforementioned heater and the two temperature sensors are positioned over or under the opening.

The heater and the two temperature sensors can preferably be positioned in such way to the opening that at least a segment of one temperature sensor that at least a segment of the heater and the second temperature sensor or a segment of each of these both elements is basically surrounded by the fluid, so that the accuracy is enhanced compared to WO 2015/074833 A1.

The first temperature sensor is positioned at a first distance from the heater which is at least 20 µm, preferably at least 45 µm, most preferably 50-200 µm.

The heater and the second temperature sensor are positioned together. They can be directly attached together.

They can preferably be positioned on a support for holding the heater and the second temperature sensor above or inside the opening. This enhances the stability of these elements. The first temperature sensor is preferably distanced from the support.

Further preferred embodiments of the measuring device are disclosed by the subject-matter of the sub-claims.

The mounting plate can comprises a main surface which extends over a first plane and wherein the opening defines a maximal cross-sectional width of the opening along the first plane and a depth of the opening perpendicular to the first plane, wherein the depth is smaller, preferably at least 3 times smaller, most preferably at least 8 times smaller, than the width of the opening. Therefore the mounting plate cannot be compared with the design of a measuring tube.

It is of advantage that the mounting plate comprises at least one or more closed side surfaces, preferably extending in perpendicular direction to the first plane. This could preferably mean that a plane defined by the side surface can be perpendicular to the first plane. Extending in perpendicular direction can also comprise according to the invention that the side surface extends in an inclined angle to the main surface, but only one vector is perpendicular to the main surface.

The mounting plate can preferably have a ring shape. Ring shape according to the invention can have circular main surface but also rectangular main surface all with a central opening.

The surface of the opening at the first plate 10 is less than 60%, preferably less than 40%, of the main surface of the mounting plate. The main surface of the mounting plate in the first plane is therefore ring shaped and is framing and/or surrounded the surface of the opening.

The mounting plate preferably comprises the said main surface which extends over a first plane and wherein the heater, the first temperature sensor and the second temperature sensor are all positions at said first plane or over a plane parallel to the first plane.

The first and the second temperature sensor, preferably also the heater, extend at least partly parallel to each other. At least the first and the second temperature sensors and preferably also the heater can be wires that extend parallel to each other above or inside the opening.

The first and the second temperature sensor are provided as a frame-like structure of the heater, wherein the second temperature sensor is provided in a second frame-like design surrounding the heater and wherein the first temperature is provided in a first frame-like design surrounding the second temperature sensor, wherein the first frame-like design is distanced to the second frame-like design.

The distance between the first frame-like and the second frame like design is preferably uniform at all positions of the frame.

The first and the second frame-like design can have either rectangular, especially square-shaped or circular form.

BRIEF DESCRIPTION OF THE DRAWINGS

An advantageous embodiment of the invention is further explained in detail by a drawing. Specific parts of the embodiments, described below, can be understood as separate features that can also be realized in other embodiments of the inventive measurement device. The combination of features described by the embodiment shall not be understood as a limitation for the invention.

DETAILED DESCRIPTION

Figure 1:
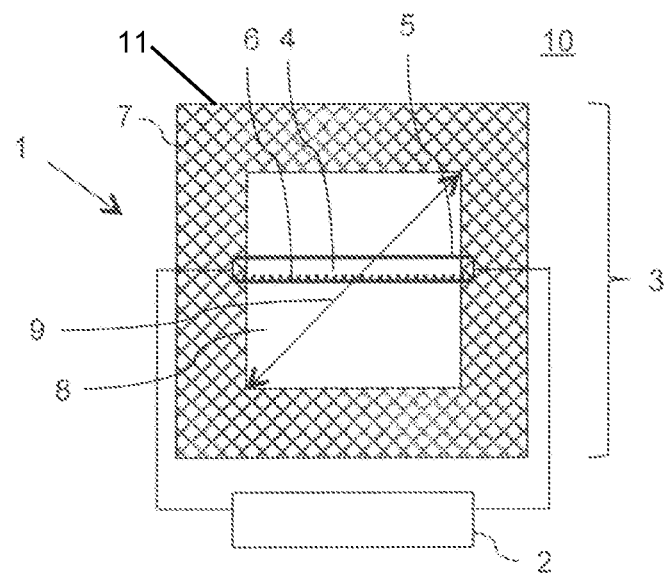
FIG. 1 shows a top view on a schematically drawing of a first embodiment of a measurement device.

A schematically drawing of a measurement device 1 according to a first embodiment of the invention is shown in FIG. 1. It comprises a thermal property sensor 3 and an evaluation unit 2.

The measurement device 1 is adapted for the determination of at least one thermal property of a fluid, especially the volumetric heat capacity and the thermal conductivity. This thermal property can be provided as information to a user or it can be used for the further determination of further values, such as the determination of a concentration, a volumetric fraction, a mass fraction and/or a partial pressure of a multi-component mixture, wherein the fluid is said multi component mixture. The multi-component mixture can preferably consist of 2-6 components.

Other possibilities are the generation of commands for the regulation of control organs of a process, such as a valve, based on the determined thermal property. The determined value for the thermal property can be used for numerous other applications.

The fluid mentioned above can be a liquid or preferably a gas or a vapour.

The evaluation unit 2 is adapted to determine the thermal property from a measurement signal determined by the thermal property sensor 3. The thermal property sensor 3 comprises a heater 4, a first and a second temperature sensor 5, 6.

The evaluation unit 2 can use a temperature oscillation technique (TOT) to operate the heater 4. The stimulation can be done by a harmonic oscillation of the heater 4.

A phase shift and an amplitude as a measurement signal are measured by the first and the second temperature sensor 1. The phase shift and the amplitude of the first temperature 5 sensor is compared to the phase amplitude shift and the amplitude of the second temperature sensor 6 by applying an algorithm which is provided as a data set at a storage device (not shown) of the evaluation unit 2.

The thermal property sensor 3 comprises a mounting plate 7, also called sensor body, with a square main surface that extends over a first plane 10, which is in FIG. 1 the plane of the drawing sheet. The mounting plate 7 can be monolithic body. The mounting plate is provided with an opening 8, which is positioned in FIG. 1 and FIG. 2 in the centre of the square surface of the mounting plate 7.

The heater, the first temperature sensor and the second temperature sensor can be arranged inside the opening 8. Alternatively these elements can be above the opening. Above can preferably mean that the elements are provided at the main surface of the mounting plate 7 so that the elements 4-6 partly cover the opening with their own sensor bodies.

The sensor body, the so-called mounting plate 7, comprises a main surface which extends over a first plane 10. The opening 8 defines a maximal cross-sectional width 9 of the opening 8 along the first plane 10 and a depth (not shown) of the opening perpendicular to the first plane 10, wherein the depth is smaller than the width 9 of the opening 8.

The mounting plate 7 comprises at least one or more closed side surfaces 11, preferably extending in perpendicular direction to the first plane 10. In the case of one side surface, the main surface of the mounting plate 7 could be circular or ellipsoidal. Closed means that the side surfaces 11 have no openings like the opening 8 of the main surface.

In FIG. 1 a thermal property sensor with free standing wires, representing the heater, the first and the second temperature sensor is shown. The middle wire represents the heater and the other two are the temperature sensors.

In the depicted embodiment of FIG. 1, one of temperature sensors, the second temperature sensor 6 is attached on the heater and the other temperature sensor, the first temperature sensor 5, has a short distance from the heater preferably 50-200 μm, most preferably 80-120 μm. The opening 8 is cavity that is formed in the body of the sensor, which is also called mounting plate 7, has rectangular form, especially a squared form with preferred dimensions of 0.2-4 mm$^2$, most preferably 0.5-2.0 mm$^2$.

The working principle of the sensor was considered the temperature oscillation technique (TOT) and the response can be investigated by using Finite Element Method (FEM).

Since the response of each temperature sensor under temperature oscillation technique is an amplitude, the thermal properties (volumetric heat capacity and thermal conductivity) can be derived from the phase difference (response of the so-called iso-amplitude and iso-phase) of the said temperature sensors and a characteristic curve for the sensor element can be derived. It has been surprisingly found that the sensitivity for temperature amplitude and phase on each fluid thermal property is higher with the thermal property sensor shown in FIGS. 1 and 2. In addition, one can even identify ambiguity on the response of the sensor, if two iso-curves are crossing each other in more than one position. Moreover, the signal could be used as a graphical method of deriving the thermal conductivity and volumetric heat capacity by finding the cross point of the two iso-curves (amplitude and phase) from the temperature sensors 5 and 6.

The second proposed sensor design considers also the spherical distribution of the heat from a point source. It consists of a small rectangular heater 4' and two rectangular rings, second temperature sensor 6' and first temperature sensor 5'. The second sensor 6' is attached on the heater. One advantage of this design is the spherical distribution of heat that has an exact analytical solution. Another advantage is the very low heat losses to the body of the sensor, which is significant in the wire base design of FIG. 1. The heater 4' and the second temperature sensor 6' are also positioned together and the first temperature sensor 5' is distanced at a distance of preferably 50-200 µm, most preferably 80-120 µm.

Figure 2:
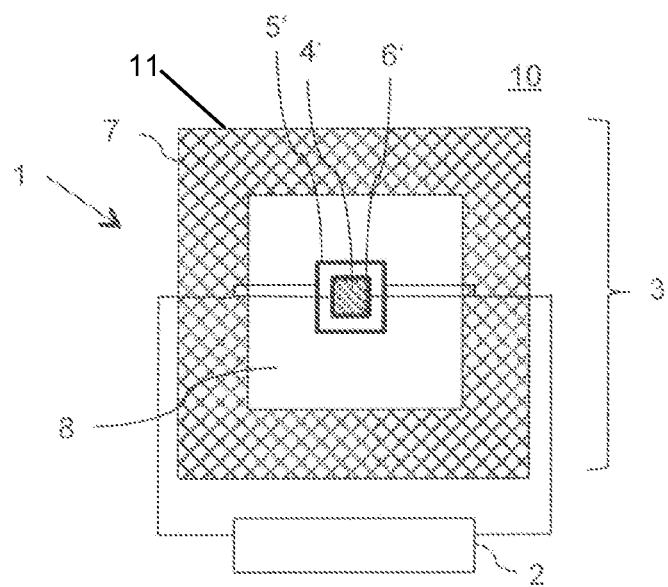
FIG. 2 shows a top view on a schematically drawing of a second embodiment of a measurement device.

As shown in FIG. 2 the heater 4' is placed in the center of the cavity or opening 8. The temperature sensors 5 and 6 have the form of homocentric rectangles, but they can also have other homocentric forms.

For the second proposed design shown in FIG. 2 two measurement concepts presented good characteristics. Firstly, using the temperature signal of the second temperature sensor 6' in low excitation frequency, for example 188 [rad/s], both amplitude and phase iso-curves show a relative homogeneous distribution and no ambiguity.

Similarly, the first temperature sensor 5 as an external ring exhibits an even more homogeneous distribution of both iso-curves. The sensitivity of the sensor in both of the measurement concepts is considered comparable and is excellent compared to other sensor designs.

The thermal property sensor proposes therefore a very sensitive determination of the thermal conductivity and the volumetric heat capacity (k, $\rho c_p$) either in a wire based or a ring based design.

As described, the sensor can operate under the TOT principle but it can be used in any known working principle (steady, TOT, transient).

The rectangular rings-based sensor could also have other form, for example, circular. However the rings should preferably be homocentric to each other, meaning they should have the same center. In an optimized design, the heater has the same form, but not the same dimensions, as the rings (circular, rectangular, triangular, . . . )

Two are the most favourable primary measurement quantities for the wire-based sensor design.

The temperature amplitude and phase of temperature sensor for low excitation frequencies from 170-200 [rad/s], most preferably 185-190 [rad/s] and the amplitude and phase difference between the second and the first temperature sensor 6, 5 for middle excitation angular frequencies 500-600 [rad/s], most preferably 550-570 [rad/s].

Similarly, two are the most favorable primary measurement quantities for the ring-based sensor.

The method of a modeling approach can be derived from the article "Measurement of Gas Thermal Properties Using the Parametric Reduced-Order Modeling Approach" by A. Bardalis, S. Stingelin and A. Pfau, IEEE Sensors Journal, Vol. 16, Issue 12, page 4704-4714, June 2016.

In general the property sensor of FIG. 1 and FIG. 2 can be performed under at least two different angular excitation frequencies, a low angular excitation frequency at around 188 rad/s and a middle angular excitation frequency.

More in general the first angular excitation frequency can be at 150-200 rad/s and the second angular excitation frequency can be at least twice as high, more preferably 2.5-3.2 times higher, as the said first angular excitation frequency.

Figure 3A:
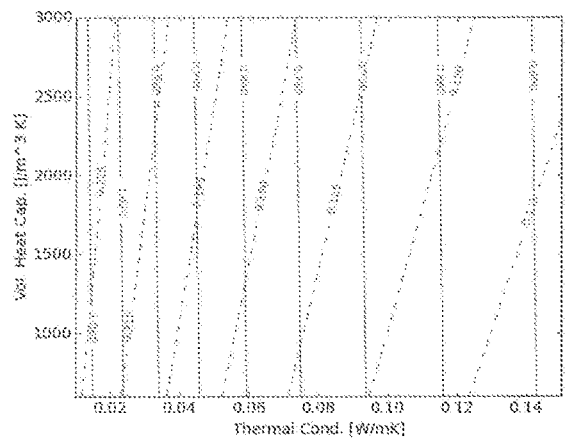
FIG. 3a shows a graphical representation of a primary measurement quantity temperature measured by a temperature sensor of the present disclosure, wherein x-axis is thermal conductivity (W/m·K) and the y-axis is volumetric heat capacitance (J/m$^3$·K)

FIG. 3a provides a graph of a primary measurement quantity temperature measured by the second temperature sensor 6 of FIG. 1. The excitation angular frequency is 188 rad/s.

Figure 3B:
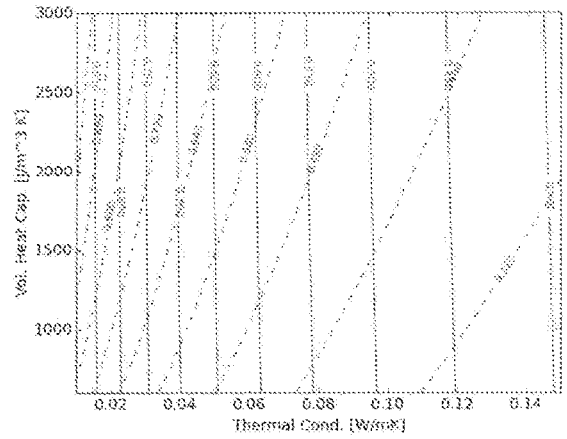
FIG. 3b shows a graphical representation of a primary measurement quantity temperature amplitude and phase difference between the two temperature sensors of the present disclosure, wherein x-axis is thermal conductivity (W/m·K) and the y-axis is volumetric heat capacitance (J/m$^3$·K)

FIG. 3b provides a graph of a primary measurement quantity temperature amplitude and phase difference between the two temperature sensors 5 and 6 at an excitation angular frequency of 188 rad/s.

From FIG. 3a the response of the second temperature sensor can be derived, while in the second FIG. 3b the amplitude and phase difference between the two temperature sensors 5 and 6 of FIG. 1 is illustrated. Both of the primary measurement quantities (amplitude and phase) are so dependent on both properties (volumetric heat capacity and the thermal conductivity) while for this range of properties does not show any ambiguity.

Two measurement concepts that presented good results are illustrated in FIGS. 3a and 3b. The contour graphs in FIGS. 3a and 3b present the response of the iso-amplitude and the iso-phase in relation to the fluid thermal properties. They were derived simulating the sensor for different combination of thermal conductivity and volumetric heat capacity. The contour of the graphs is a kind of characteristic curve for the sensor that operates under temperature oscillation technique.

This graph exhibits the dependency-sensitivity of each primary measurement quantity (temperature amplitude and phase) on each fluid thermal property. In addition, ambiguity on the response of the sensor can even be identified, if two iso-curves are crossing each other in more than one position. Moreover, the contour graph could be used as a graphical method of deriving the thermal conductivity and volumetric heat capacity by finding the cross point of the two iso-curves (amplitude and phase).

Figure 4A:
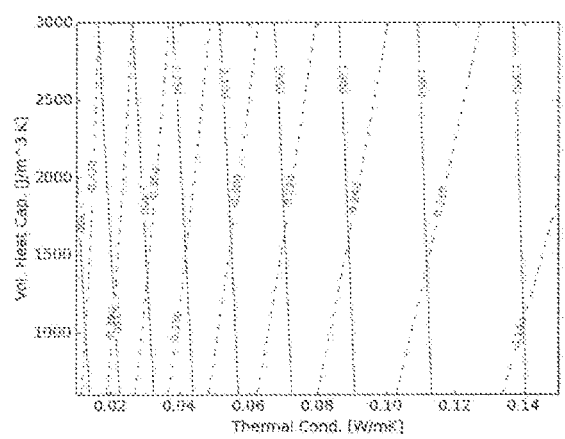
FIG. 4a shows a graphical representation of a primary measurement quantity temperature measured by a temperature sensor of the present disclosure, wherein x-axis is thermal conductivity (W/m·K) and the y-axis is volumetric heat capacitance (J/m$^3$·K)
Figure 4B:
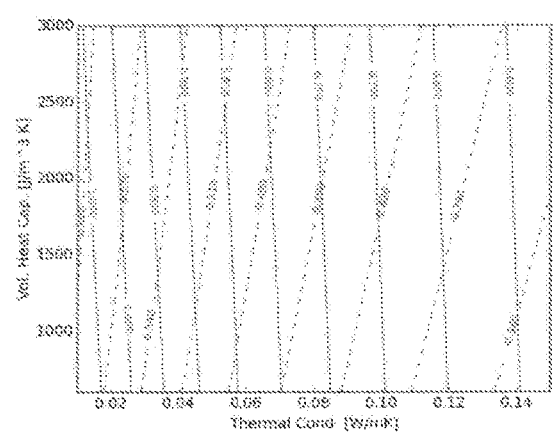
FIG. 4b shows a graphical representation of a primary measurement quantity temperature amplitude and phase difference between the two temperature sensors of the present disclosure, wherein x-axis is thermal conductivity (W/m·K) and the y-axis is volumetric heat capacitance (J/m$^3$·K).

Likewise FIG. 4a shows a primary measurement quantity temperature on the second temperature sensor 6' of FIG. 2. The excitation angular frequency is 188 rad/s. FIG. 4b depicts the primary measurement quantity temperature amplitude and phase difference between the two temperature sensors 5' and 6' of FIG. 2. The excitation angular frequency is 188 rad/s.

For the second proposed design of FIG. 2 two measurement concepts presented good characteristics FIGS. 4a and 4b. Firstly, by using the temperature of the second temperature sensor 6' in low excitation frequency 188 rad/s both amplitude and phase iso-curves show a relative homogeneous distribution and no ambiguity.

Similarly, the first temperature sensor 5' as an external ring exhibits an even more homogeneous distribution of both iso-curves. The sensitivity of the sensor in both of the measurement concepts is considered comparable.

The invention claimed is:

1. A measuring device for the determination of at least one thermal property of a fluid, the device comprising:
    a thermal property sensor, the thermal property sensor comprising:
        a mounting plate with an opening therethrough;
        a heater;
        a first temperature sensor; and
        a second temperature sensor, wherein the heater, the first temperature sensor and the second temperature sensor are arranged above or inside the opening, and wherein the heater and the second temperature sensor are disposed adjacent each other above or inside the opening; and an evaluation unit configured to determine the at least one thermal property of the fluid from a measurement signal generated by the thermal property sensor, wherein the first temperature sensor is positioned at a first distance to the heater, wherein the first distance is at least 20 µm, and wherein the first temperature sensor and the second temperature sensor are provided as a framing structure of the heater, wherein the second temperature sensor is in a second frame-like structure surrounding the heater, and wherein the first temperature sensor is in a first frame-like structure surrounding the second temperature sensor, wherein the first frame-like structure is separated at a distance to the second frame-like structure.

2. The device of claim 1, wherein the at least one thermal property is a volumetric heat capacity and/or a thermal conductivity of the fluid.

3. The device of claim 1, wherein the first distance is at least 45 µm.

4. The device of claim 1, wherein the first distance is at least 50-200 µm.

5. The device of claim 1, wherein the mounting plate includes at least one or more closed side surfaces extending perpendicular to a first plane, which includes a main surface of the mounting plate.

6. The device of claim 1, wherein the mounting plate has a ring shape.

7. The device of claim 1, wherein the thermal property sensor is configured to operate under at least two angular excitation frequencies, wherein a first angular excitation frequency is 150-200 rad/s and a second angular excitation frequency is at least twice as great as the first angular excitation frequency.

8. The device of claim 1, wherein the mounting plate includes a main surface that extends over a first plane, and wherein the heater, the first temperature sensor and the second temperature sensor are arranged at a same plane, which is the first plane or a plane parallel to the first plane.

9. The device of claim 1, wherein the distance between the first frame-like structure and the second frame-like structure is uniform at all positions of the first frame-like and second frame-like structures.

10. The device of claim 1, wherein the first frame-like structure and the second frame-like structure have a rectangular or circular form.

11. The device of claim 1, wherein the first temperature sensor and the second temperature sensor extend at least partly parallel to each other.

12. The device of claim 11, wherein the heater extends at least partly parallel to each of the first temperature sensor and second temperature sensor.

13. The device of claim 1, wherein the first temperature sensor and the second temperature sensor are wires that extend parallel to each other above or inside the opening.

14. The device of claim 13, wherein the heater includes a wire that extends above or inside the opening parallel to each of the first temperature sensor and second temperature sensor.

15. The device of claim 1, wherein:
the mounting plate includes a main surface that extends over a first plane;
the opening has a maximal cross-sectional width along the first plane and a depth perpendicular to the first plane; and
the depth is smaller than the width of the opening.

16. The device of claim 15, wherein a surface of the opening at the first plane is less than 60% of the surface of the main surface of the mounting plate.

17. The device of claim 15, wherein the depth is at least three times smaller than the width.

18. A measuring device for the determination of at least one thermal property of a fluid, the device comprising:
a thermal property sensor, the thermal property sensor comprising:
a mounting plate with an opening therethrough;
a heater;
a first temperature sensor; and
a second temperature sensor, wherein the heater, the first temperature sensor and the second temperature sensor are arranged above or inside the opening, and wherein the heater and the second temperature sensor are disposed adjacent each other above or inside the opening; and
an evaluation unit configured to determine the at least one thermal property of the fluid from a measurement signal generated by the thermal property sensor,
wherein the first temperature sensor is positioned at a first distance to the heater, wherein the first distance is at least 20 µm, and
wherein the thermal property sensor is configured to operate under at least two angular excitation frequencies, wherein a first angular excitation frequency is 150-200 rad/s and a second angular excitation frequency is at least twice as great as the first angular excitation frequency.

* * * * *